INVENTOR.
Raymond A. Deibel and
BY Frederick R. Weymouth Jr.

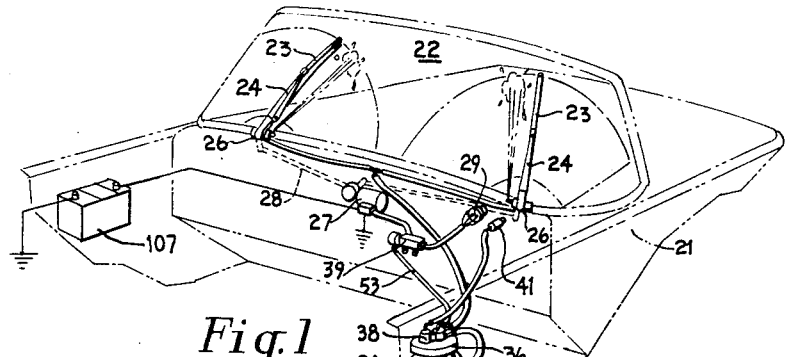
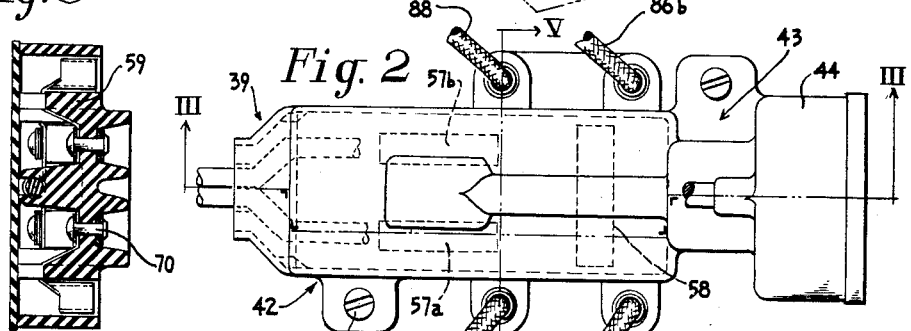
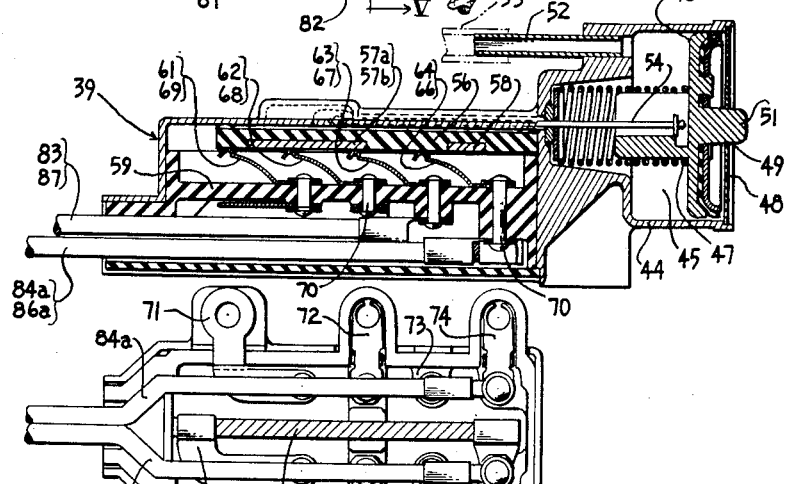

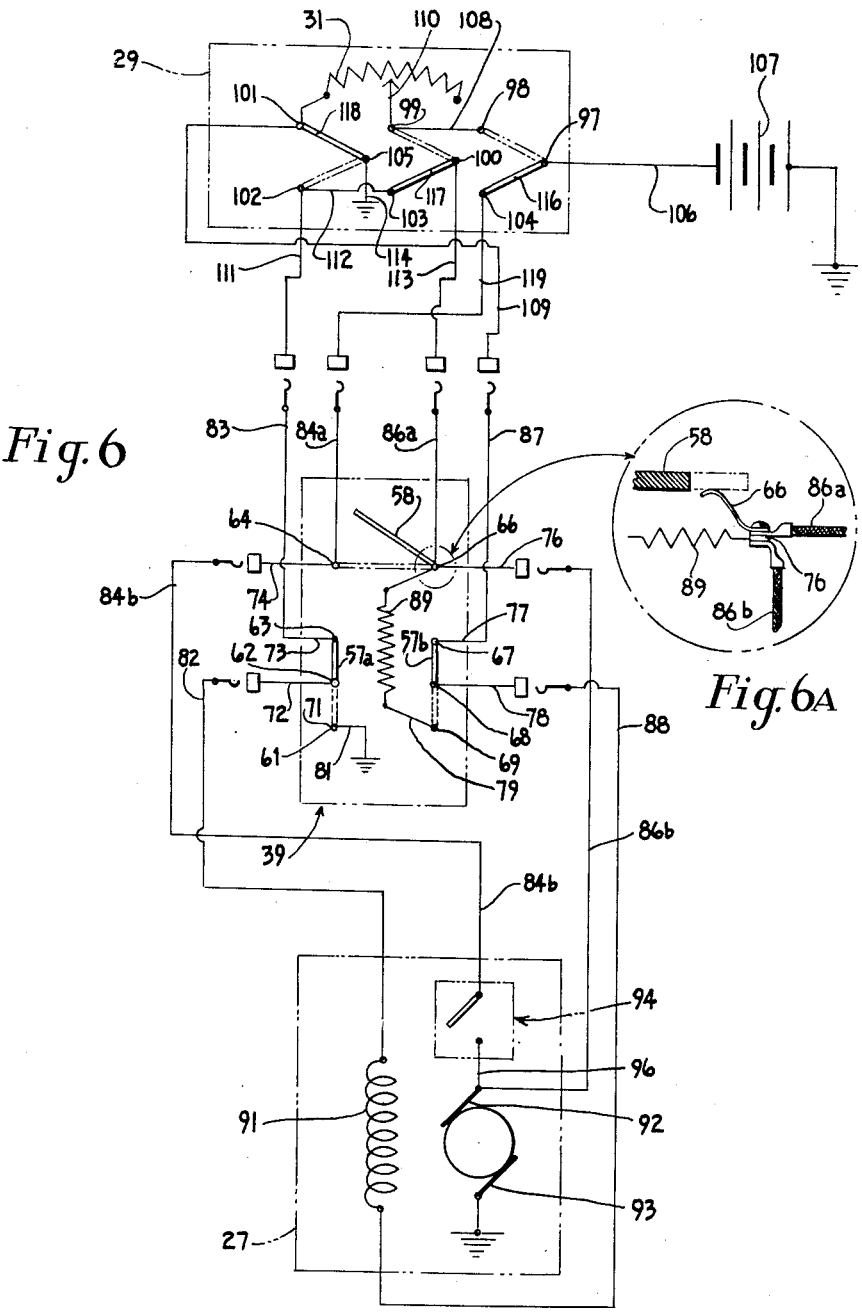

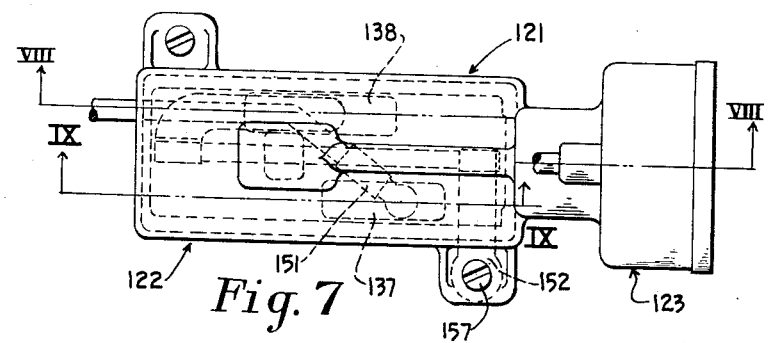
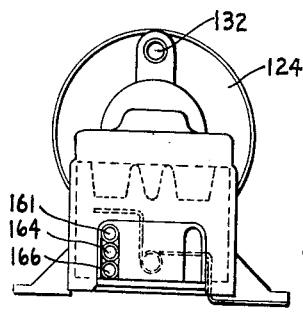
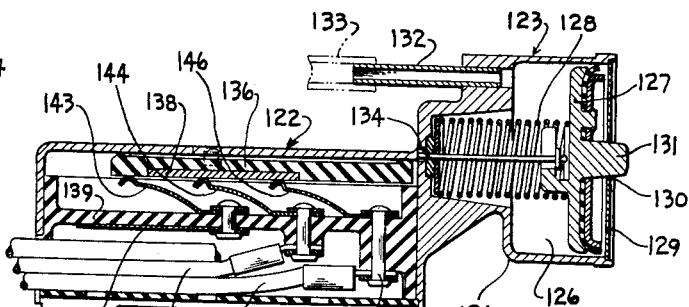
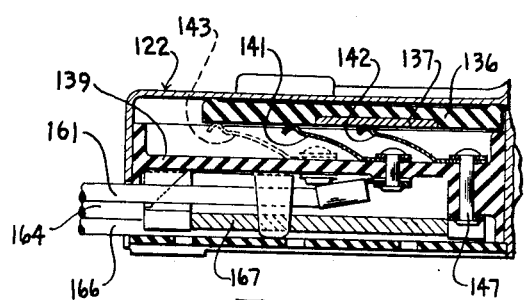

Bean Brooks Buckley + Bean
ATTORNEYS

March 1, 1960 R. A. DEIBEL ET AL 2,926,376
WINDSHIELD CLEANING SYSTEM
Filed July 5, 1956 6 Sheets-Sheet 6

INVENTOR.
Raymond A. Deibel and
BY Frederick R. Weymouth Jr.
Bean Brooks Buckley + Bean
ATTORNEYS

United States Patent Office 2,926,376
Patented Mar. 1, 1960

2,926,376

WINDSHIELD CLEANING SYSTEM

Raymond A. Deibel, Cheektowaga, and Frederick R. Weymouth, Jr., Buffalo, N.Y., assignors to Trico Products Corporation, Buffalo, N.Y.

Application July 5, 1956, Serial No. 596,092

12 Claims. (Cl. 15—250.02)

This invention relates to a windshield cleaning system, and more particularly to a windshield cleaning system having an electrically powered wiper motor.

In the copending application of R. Deibel and Wm. C. Reister, Serial No. 530,970, filed August 29, 1955, now Patent No. 2,877,486, a windshield cleaning system is disclosed in which a vacuum operated wiper motor is turned on substantially concurrent with a windshield washer mechanism and then given a prolonged operating cycle following application of cleaning solvent from a reservoir assembly to the windshield surface, which cycle is controlled by retention of hydraulic pressure in the reservoir assembly for a predetermined period of time. The system of the present invention utilizes a reservoir assembly like that of the aforesaid application, in conjunction with an electrically powered wiper motor, and includes an electric switch means which automatically controls wiper motor operation during windshield cleaning.

By means of the invention the motor vehicle operator can initiate a windshield washing and wiping cycle in a simple and convenient manner. More particularly, by simply pushing a single control button, cleaning liquid is sprayed upon the windshield in the desired manner for washing, the electrically powered wiper motor is started, the windshield spray operation is terminated, and the wiper motor continues to operate for several strokes wiping the windshield dry, after which motor operation ceases. The invention may be easily incorporated in a vehicle having an electrically powered wiper motor, and will provide reliable and satisfactory service.

The main object of this invention is to provide a motor vehicle, having an electrically powered wiper motor, with a windshield washer-wiper system having a single control means, which when manipulated by the vehicle operator will initiate a complete washer-wiper cycle.

Another object of the invention is to provide a switch means operatively responsive to fluid pressure to cause operation of an electrically powered wiper motor, in coordination with a windshield washing operation.

These and further objects and features of the invention will become more apparent from the following description and the related drawings wherein;

Fig. 1 is a fragmentary perspective view of a motor vehicle illustrating an embodiment of the invention;

Fig. 2 is a top plan view of an electric switch means of the invention;

Fig. 3 is a section view as seen from line III—III in Fig. 2;

Fig. 4 is a bottom plan view of the electric switch means;

Fig. 5 is a partial section view as seen from line V—V in Fig. 2;

Fig. 6 is a wiring diagram illustrating the manner in which the electric switch means of Fig. 2 may be incorporated in the circuit of a motor vehicle having an electrically powered wiper motor;

Fig. 6A is a schematic view, illustrating the wiring connection between certain elements at the point indicated in the wiring diagram;

Fig. 7 is a top plan view of a modified electric switch means which embodies the principles of the invention;

Fig. 8 is a section view as seen from line VIII—VIII in Fig. 7;

Fig. 9 is a section view as seen from line IX—IX in Fig. 7;

Fig. 10 is an end view of the electric switch means of Fig. 7;

Figure 11:
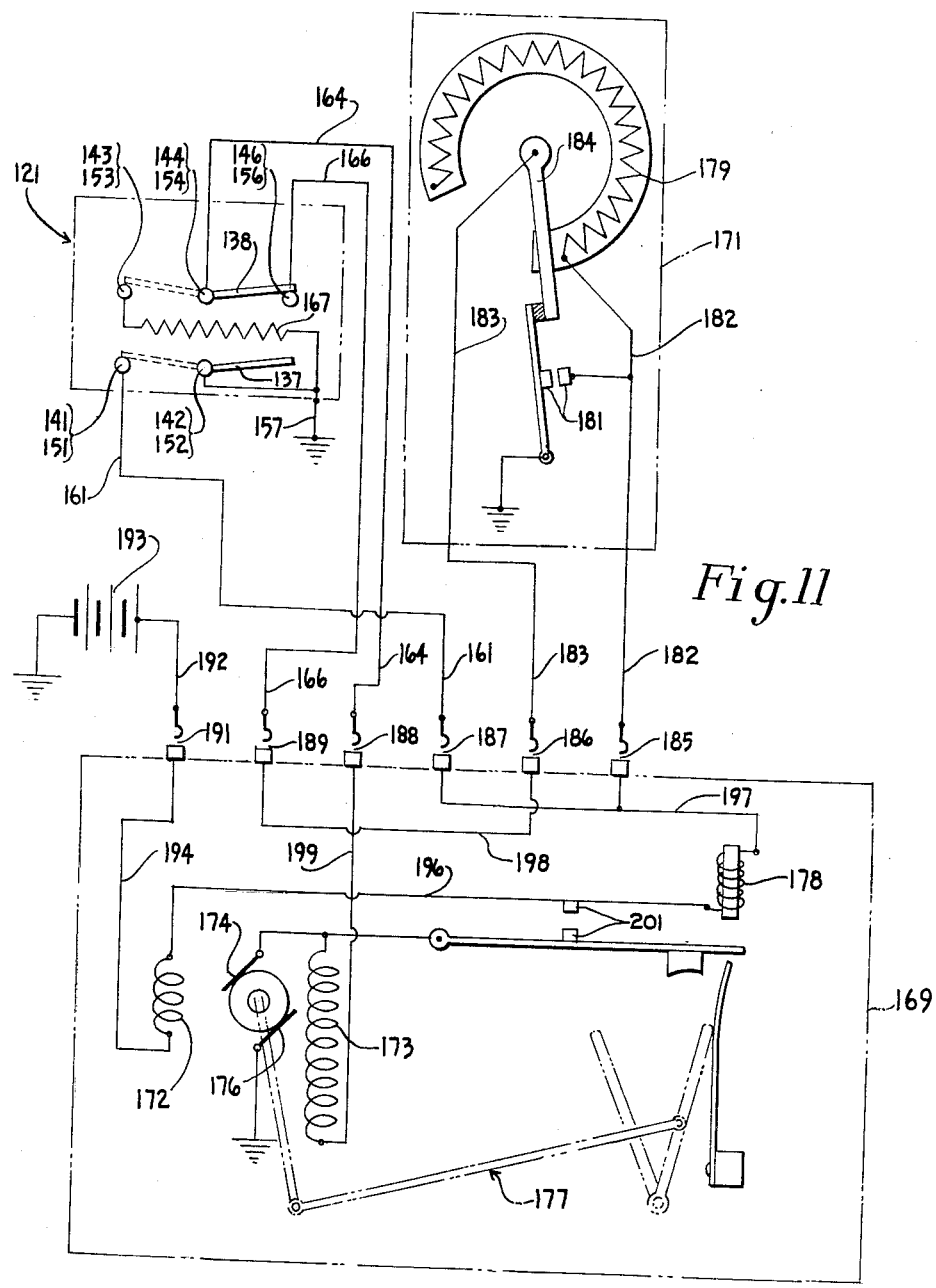
Fig. 11 is a wiring diagram illustrating the manner in which the electric switch means of Fig. 7 may be incorporated in the circuit of a motor vehicle having an electrically powered wiper motor.

Referring now to the drawings, and more particularly to Figs. 1–6, numeral 21 identifies a motor vehicle having a windshield 22 of the panoramic type, and wiper blades 23 supported on wiper arms 24, the latter of which are mounted upon wiper shafts 26, connected to a wiper motor 27 via flexible transmission means, such as cables 28, all in the usual manner. The wiper motor 27 is electrically powered and is controlled by switch means 29 which incorporates a rheostat 31, to provide variable speed control of the motor, in a manner that is well known to those skilled in the art.

A reservoir assembly 32 is arranged in a convenient position under the hood of the vehicle, and is connected by a hose, or conduit, 33 to a source of vacuum, such as the vehcile intake manifold. The reservoir assembly includes a pump unit 34 affixed to a reservoir cover 36, to project downwardly into a reservoir liquid container 37, while on the upper surface of the cover 36 is mounted a coordinating mechanism 38, which functions to provide several operative effects. More particularly, the coordinating mechanism 38 functions to initiate operation of the pump unit 34, operation of an electric switch 39, and to regulate the period of wiper motor operation. For an understanding of the detailed structure of the reservoir, reference may be had to the aforesaid Patent No. 2,877,486.

Figure 16:
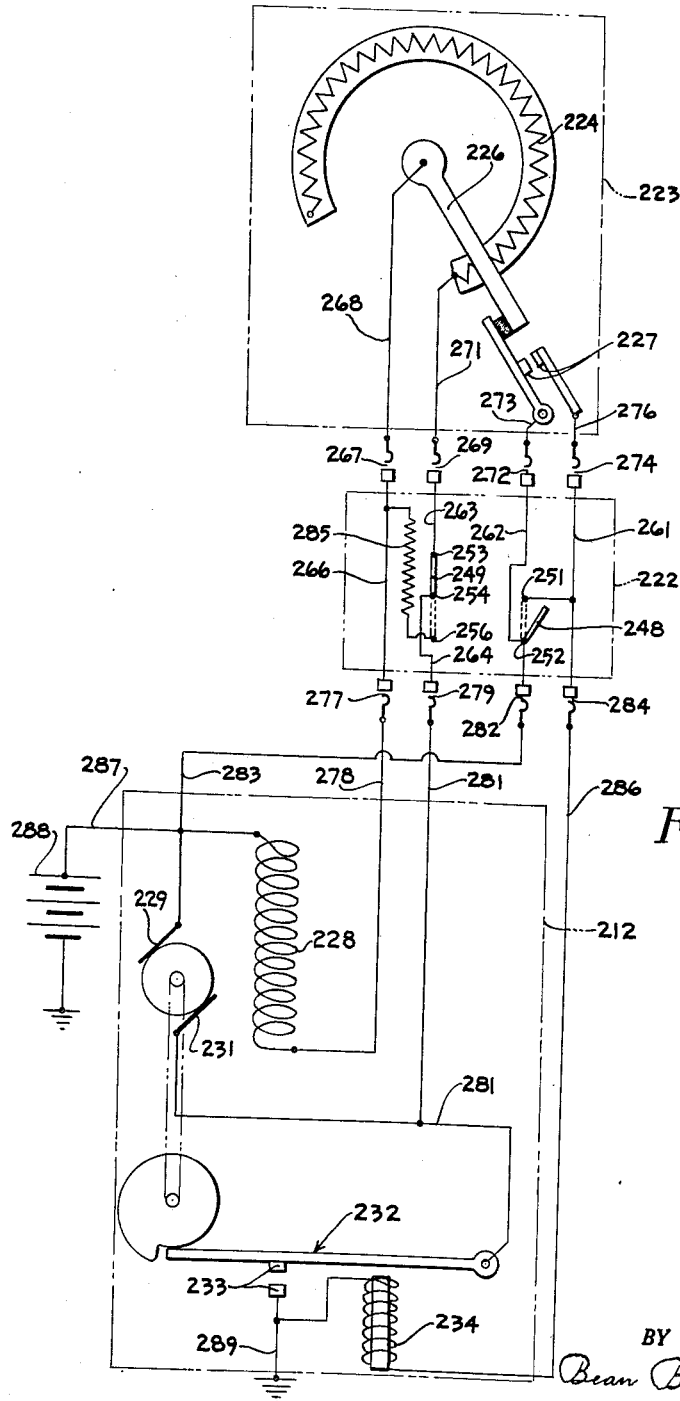
Fig. 16 is a wiring diagram illustrating the application of the switch of Fig. 13 in a wiper motor circuit of a vehicle having an electrically powered wiper motor.

A control button 41 mounted in the vehicle for covenient manipulation by the vehicle operator, is used to initiate operation of the coordinating mechanism 38. Electric switch 39 includes an electrical portion 42, and a pneumatic portion 43. The latter includes a housing 44 having a piston chamber 45 in which is slidably mounted a piston 46, and a helical spring 47 compressively arranged between the piston and the end of the piston chamber. A cover plate 48 encloses the open end of the piston chamber and has a centrally disposed hole 49 of slightly larger diameter than that of a projection 51 on the piston which exposes the outer side of the piston to atmosphere. A nipple 52, arranged in the housing 44, is adapted to receive a vacuum hose, or conduit, 53 for the evacuation of the piston chamber on one side of the piston, whereupon the pressure differential acting upon the piston will result in movement thereof to the left (Fig. 3). A rod, or wire, 54 having one end affixed to the piston extends into the electrical portion 42 and is connected to a movable member 56 slidably arranged in the electrical portion. The movable member 56 is formed of an electric insulating material and has on the lower surface connectors 57–a, 57–b, and 58. With reference to schematic illustrations of the various switches in the circuit diagrams (Figs. 6, 11 and 16), the movable members therein are shown in solid lines in their normal, or rest positions, and in dashed lines in their operative, or on-positions.

Mounted upon an electrically insulated rib 59, which is arranged parallel to the movable member 56, are contact arms 61, 62, 63, 64, 66, 67, 68 and 69, formed of a resilient electrical conducting material and compressively arranged in abutment with the undersurface of the movable member 56. The contact arms are affixed to the rib 59 by means of rivets 70, extending through the rib and connecting on the lower side with terminals 71, 72, 73, 74, 76, 77, 78 and 79 respectively. Terminal 71 is grounded by means of screw 81; terminals 72, 73, 77 and 78 are connected with wires 82, 83, 87 and 88 respectively; terminal 74 connects with wires 84–a and 84–b; terminal 76 connects with wires 86–a and 86–b; and terminal 79 connects with resistance wire 89, the other end of the resistance wire being connected to terminal 76.

The wiper motor 27 includes a field winding 91, the ends of which are connected to wires 82 and 88; armature brushes 92 and 93, the former of which is connected to wire 86–b the latter of which is grounded; and a parking switch 94 connected to wire 84–b, the switch being adapted for actuation by linkage means (not shown), which is connected to the motor in a manner to effect motor parking, as will be understood by those skilled in the art.

The switch means 29, which is of the park-and-run type, having rheostat 31 for variable speed control, has contact points, or terminals, 97 to 105 inclusive. Terminal 97 has connected thereto a wire 106, the other end of said wire being connected to a battery 107 of the motor vehicle; terminals 98 and 99 are joined by a wire 108; contact point 101 is connected to wire 109; contact point 102 is connected to wire 111; terminals 102 and 103 are connected by wire 112; terminal 100 is connected to wire 113; and terminal 105 is connected to ground wire 114. Movable contact arms are arranged for connection with contact points as follows: contact arm 116 and contact points 98 and 104; contact arm 117 and contact points 99 and 103; and contact arm 118 with contact points 101 and 102; while contact point 104 is connected to a wire 119.

The manner in which the switch means 39 is arranged, and functions, is as follows: wires 83, 84–a, 86–a and 87 of the switch 39 are connected to wires 111, 119, 113 and 109 of switch 29 respectively; wires 82, 84–b, 86–b and 88 are connected to the terminals of switch 39, as heretofore explained. With the switch 29 in position for parking, as shown by solid lines in Fig. 6, and with the movable member 56 of switch 39 in parked position, as illustrated in Fig. 3, and by the solid lines in Fig. 6, it will be seen that two electrical circuits from the switch means 29 to the motor 27 are possible, one for its armature and one for its field: the first of these circuits will be from battery 107, through wire 106, contact arm 116, contact point 104, wire 119, wire 84–a, contact arm 64, terminal 74, wire 84–b to parking switch 94, and when the latter is closed, the circuit will continue through wire 96 and across the motor armature via brushes 92 and 93 to ground; and also from wire 96, through wire 86–b, terminal 76, contact arm 66, wire 86–a, wire 113, contact point 100, contact arm 117, contact point 103, wire 112, contact point 102, wire 111, wire 83, terminal 73, contact arm 63, connector 57–a, contact arm 62, terminal 72, wire 82, through field winding 91, to wire 88, terminal 78, contact arm 68, connector 57–b, contact arm 67, terminal 77, wire 87, wire 109, contact point 101, contact arm 118, terminal 105, and wire 114 to ground. As a result of such circuits, the motor will rotate to parked position, at which time the parking switch linkage will break the circuit through the parking switch, and thereby stop the motor in parked position. The second of said circuits will be established when the contact arm 116 is moved to engage contact point 98, and simultaneously contact arms 117 and 118 will be moved to engage contact points 99 and 102 respectively, thus establishing circuits from the battery through contact arm 116, contact point 98, wire 108, contact point 99, contact arm 117, contact point 100, wire 113, wire 86–a, terminal 76, wire 86–b, and across the motor armature via brushes 92 and 93 to ground. At the same time a circuit will be established through movable arm 110, and the resistor of rheostat 31, contact point 101, wire 109, wire 87, terminal 77, contact arm 67, connector 57–b, contact arm 68, terminal 78, wire 88, across motor field winding 91, to wire 82, terminal 72, contact arm 62, connector 57–a, contact arm 63, terminal 73, wire 83, wire 111, contact point 102, contact arm 118, terminal 105, and to ground via wire 114, thereby causing operation of the motor, with the speed depending upon the setting of the rheostat 31, as will be readily understood by those skilled in the art.

When vacuum is introduced into the piston chamber 45, the piston will be moved to the left, as heretofore explained, and the movable member 56 will accordingly be shifted toward the left end of the switch (Fig. 3). In such position of the movable member 56, electrical circuits will be established as follows: from battery 107, through wire 106, contact point 97, contact arm 116, contact point 104, wire 119, wire 84–a, terminal 74, contact arm 64, connector 58, contact arm 66, terminal 76, wire 86–b, and across the motor armature via brushes 92 and 93 to ground. At the same time, a circuit will be established from terminal 76, through resistance wire 89, terminal 79, contact arm 69, connector 57–b, contact arm 68, terminal 78, wire 88, across field winding 91 to wire 82, through terminal 72, contact arm 62, connector 57–a, contact arm 61, terminal 71, to ground through grounding screw 81, whereby the wiper motor will be caused to operate.

Assume that the contact arms 116, 117 and 118 were positioned to cause motor operation, as heretofore described, at the time the movable member 56 is shifted toward the left end of the switch, then the rheostat 31 will be disconnected from the motor field winding, and instead resistance 89 will be interposed, in the following manner: a circuit will be established from the battery through contact arm 116, contact point 98, wire 108, contact point 99, contact arm 117, contact point 100, wire 113, wire 86–a, contact arm 66, terminal 76, wire 86–b, and across the motor armature via brushes 92 and 93 to ground. At the same time, a circuit will be completed from terminal 76, through resistance wire 89, terminal 79, contact arm 69, connector 57–b, contact arm 68, terminal 78, wire 88, across field winding 91, through wire 82, terminal 72, contact arm 62, connector 57–a, contact arm 61, terminal 71, to ground through ground screw 81. It will be seen that when the latter described circuit is established, the rheostat 31 will be removed from circuit to the field winding 91, by virtue of the fact that the connector 57–b is moved away from contact with the contact arm 67.

To summarize briefly, analysis of the above described circuit will show that when the movable member 56 of the switch 39 is in the extreme right side position (Fig. 3), the switch 29 will control operation of the motor 27 to provide either motor parking or motor running, while when the movable member 56 is in the extreme left position, as a result of vacuum being applied to piston chamber 45, the switch 39 will control operation of the motor to the exclusion of the switch 29. In other words, it will be seen that when the motor is operating under the control of switch 29, and switch 39 is brought into operation, the latter will take over control of the motor for as long as the movable member 56 remains in the extreme left position (Fig. 3), and that control of the motor will be restored to switch 29 when the movable member 56 is moved toward the extreme right position as illustrated in Fig. 3; if the motor is not operating when switch 39 is activated, then parking of the motor will be accomplished by switch 29 in the usual manner, when operation of switch 39 is terminated.

The resistance of the wire 89 in switch 39, has an ohmic rating which regulates current flow through the motor field to cause high-speed motor operation when the switch 39 has control of the motor. For such reason, the wiping of the windshield during and following washer operation, proceeds at a rapid rate.

The arrangement of the coordinating mechanism 38 is such as to make vacuum connection with the switch piston chamber 45, when the coordinating mechanism has initiated pump operation to spray cleaning liquid upon the windshield, and such vacuum connection will be maintained by the coordinating mechanism for wiper motor operation to provide several strokes of the wiper blades after spray of cleaning liquid is terminated. The complete washer-wiper cycle, including operation of switch 39, results from the operation of the control button 41, as will be fully understood by an understanding of the structure and function of the coordinating mechanism 38, as disclosed in aforesaid Patent No. 2,877,486.

A modified form of an electrical switch means embodying the principles of the invention is illustrated in Figs. 7 to 10 inclusive. Numeral 121 identifies a modified form of electrical switch means, which includes an electrical portion 122 and a pneumatic portion 123. The latter has a housing 124 with a piston chamber 126, in which is slidably mounted a piston 127, and a helical spring 128 compressively arranged between the piston and the end of the piston chamber. A cover plate 129 encloses the open end of the piston chamber and has a centrally disposed hole 130 of slightly larger diameter than that of the projection 131 on the piston, to thereby expose the outer side of the piston to atmosphere. A nipple 132, arranged in the housing 124, is adapted to receive a vacuum hose, or conduit 133, for the evacuation of the piston chamber on one side of the piston whereupon the pressure differential acting upon the piston will result in movement thereof to the left (Fig. 8). A rod, or wire 134, having one end affixed to the piston, extends into the electrical portion 122 and is connected to a movable member 136 that is slidably arranged in the electrical portion. The movable member 136 is formed of an electric insulating material, and has on the lower surface connectors 137 and 138.

Mounted upon an electrically insulated rib 139, are contact arms 141, 142, 143, 144 and 146, formed of a resilient electrical conducting material and compressively arranged in abutment with the undersurface of the movable member 136. The contact arms are affixed to the rib 139 by means of rivets 147 extending through the rib and connecting on the lower side with terminals 151, 152, 153, 154 and 156 respectively. Terminal 152 is grounded by means of a screw 157; terminals 151, 154 and 156 are connected with wires 161, 164 and 166 respectively; terminal 143 connects with resistance wire 167, the other end of the resistance wire 167 being connected to terminal 152.

The electrical switch means 121 is arranged for connection into the circuit extending between a wiper motor 169 and an electrical control switch 171. The wiper motor includes field windings 172 and 173, armature brushes 174 and 176, and a motor parking linkage arrangement 177 having a solenoid 178, said linkage arrangement being connected to the wiper motor, all as indicated in Fig. 11.

The control switch means 171 includes a rheostat 179, arranged for motor speed control, and contact points 181 arranged for grounding a circuit including wire 182, one end of the latter connecting with the resistance wire of rheostat 179, the other end of which connects with plug-in connector 185. A wire 183, connected to the pivot point of the rheostat arm 184, extends from the switch for connection with a plug-in connector 186. Plug-in connectors 187, 188, 189 and 191 are adapted for reception of wires 161, 164, 166 and wire 192 leading from a battery 193, respectively. The plug-in connectors are arranged for completion of electrical circuits through the motor as follows: plug-in connector 191, wire 194, field winding 172, wire 196, solenoid 178, and wire 197, the last of which connects with plug-in connectors 185 and 187; plug-in connector 186, wire 198, plug-in connector 189; plug-in connector 188, wire 199, field winding 173, and armature brushes 174 and 176 to ground. It will be noted that armature brush 174 will be in circuit with wire 196 when the solenoid 178 is energized to cause contacts 201 to close.

When the movable member 136 is positioned at the right end of the electrical portion 122 (Fig. 8), connector 137 will be engaged by contact arm 142, while connector 138 will be engaged by contact arms 144 and 146. When the movable member is shifted toward the left end of the electrical portion, which will result when piston chamber 121 is evacuated on one side of the piston, causing the piston 127 to move toward the left as a result of atmospheric pressure on the outer side thereof, the connector 137 will be engaged by contact arms 141 and 142, while the connector 138 will be engaged by contact arms 143 and 144.

The manner in which the switch means 121 functions will now be described. Assume that the vehicle operator has manipulated the control switch 171 so that connection is made between contact points 181, and that the electrical switch 121 is in the position illustrated in Fig. 8, electrical circuits will be established to cause motor operation as follows: current will flow from the battery 193, through wire 192, plug-in connector 191, wire 194, field winding 172, solenoid 178, wire 197, plug-in connector 185, wire 182, and contacts 181 to ground, whereupon solenoid 178 will be energized to thus cause closing of contacts 201. Upon occurrence of the latter, circuit will be completed from wire 196, through contacts 201, across the motor armature brushes 174 and 176 to ground, and also through field winding 173, wire 199, plug-in connector 188, wire 164, terminal 154, contact arm 144, connector 138, contact arm 146, terminal 156, wire 166, plug-in connector 189, wire 198, plug-in connector 186, wire 183, rheostat arm 184, resistance 179, and wire 182, through contact points 181 to ground. As a result, the wiper motor will be caused to operate at a speed depending upon the setting of the rheostat arm 184, as will be understood by those skilled in the art.

When the piston chamber 126 is evacuated, resulting in the shifting of the movable member 136 toward the left in electrical portion 122, control of the wiper motor will be assumed by the electrical switch 121 in the following manner: assume that rheostat arm 184 of the electrical control switch 181 is in the off-position (Fig. 11), shifting of the movable member 136 will cause motor operation by establishment of the following circuits; current will flow from battery 193, wire 192, plug-in connector 191, wire 194, field winding 172, wire 196, solenoid 178, wire 197, plug-in connector 187, wire 161, terminal 151, contact arm 141, connector 137, contact arm 142, terminal 152, and through screw 157 to ground, thereby energizing solenoid 178 to close contacts 201. When the latter occurs, circuits will be completed from wire 196, through contacts 201, through the armature brushes 174 and 176 to ground, and also through field winding 173, wire 199, connector plug-in 188, wire 164, terminal 154, contact arm 144, connector 138, contact arm 143, terminal 153, resistance wire 167, terminal 152, through screw 157 to ground. Motor operation will then take place, the motor speed being dependent upon the value of the resistance 167 which will now be the controlling resistance in the circuit of field winding 173. A second possibility for motor control by switch 121 will take place when the movable member 136 has been shifted toward the left end of the electrical portion, and the switch 171 is in on-position. It will be seen under such condition that circuits will be established whereby control of the motor is transferred from control switch 171 to switch 121 via the following circuit arrangement: the circuit through control switch 171, viz., wire 183, rheostat arm 184, rheostat 179, wire 182, and contacts 181 to ground, will be interrupted when the connector 138 is moved out of engagement with contact arm 146, since the circuit through wire 183 depends upon engagement between contacts 138 and contact arm 146. Under such condition, circuit for motor operation will be completed as follows: from battery 193, wire 192, contact switch 191, wire 194, field winding 172, contacts 201, through armature brushes 174 and 176 to ground, and across field winding 173, to wire 199, plug-in connector 188, wire 164, terminal 154, contact arm 144, connector 138, contact arm 143, connector 153, resistance wire 167, terminal 152, through switch 157 to ground.

Analysis of the foregoing described circuits will show that the electrical switch 121 when operated, will assume control of the wiper motor irrespective of whether or not the control switch 171 has been set for motor operation. In case the control switch 171 has been set for motor operation, and the electrical switch 121 is operated by shifting of the movable member 136, control of the motor will be assumed by the electrical switch 121, which control will be maintained until the movable member 136 is shifted to its original position (Fig. 8).

The vacuum hose 133 will be connected to a co-ordinator mechanism 38, such as has been described with reference to the Figs. 1 to 6 illustrations. It might also be stated that the control switch 171, like the switch means 29 of the first described embodiment, will be positioned in the motor vehicle for convenient manipulation by the vehicle operator.

Another modified form of an electrical switch means embodying the principles of the invention is illustrated in Figs. 12 to 16 inclusive. The washer-wiper system of this embodiment differs from those which have been described herein, insofar as a foot-operated pump is utilized for generating hydraulic pressure for spraying cleaning liquid upon the vehicle windshield. Such a washer system, used in connection with a vacuum operated wiper motor, is disclosed in copending patent application Serial No. 542,619, filed October 25, 1955, and reference may be had thereto for a detailed description of the foot-operated pump and reservoir assembly.

Figure 12:
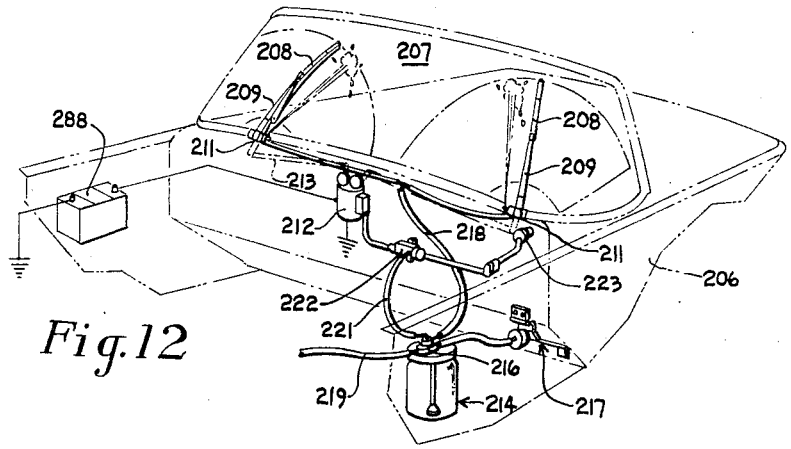
Fig. 12 is a fragmentary perspective view of a motor vehicle illustrating a modified form of the invention as used in a motor vehicle having a windshield washer-wiper system operated by a foot lever.
Figure 13:
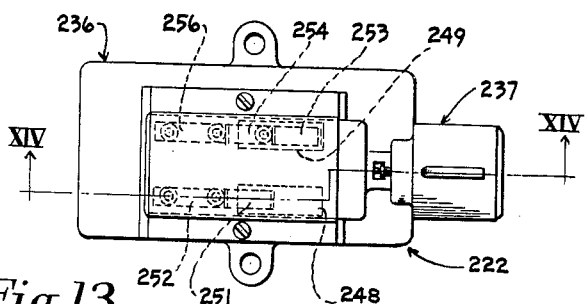
Fig. 13 is a top plan view of an electric switch means used in the system illustrated in Fig. 12.

Referring to Fig. 12, numeral 206 identifies a motor vehicle having a windshield 207 of the panoramic type, and wiper blades 208 supported upon wiper arms 209 for wiping of the windshield, said arms 209 being mounted upon drive shafts 211, oscillated by an electrical wiper motor 212 via variable transmission means such as cables 213.

A reservoir assembly 214 has a coordinating mechanism 216 which functions upon actuation of a foot-control pump means 217, for delivery of cleaning liquid through hose 218 to the windshield. The coordinating mechanism has a hose 219 connected to a source of vacuum, such as the engine intake manifold and is arranged for transmission of vacuum via hose 221 to an electrical switch means 222.

The latter is connected in an electrical circuit extending between the motor 212, and a control switch 223 mounted in the vehicle for convenient manipulation by the vehicle operator. The switch means 222, like the switch means heretofore disclosed, functions to cause wiper motor operation during application of cleaning fluid to the windshield, and to continue motor operation for a short time after cessation of cleaning liquid application.

The control switch 223 has a rheostat 224, and a rheostat arm 226 movable for regulation of wiper motor speed in the usual manner. The control switch also has a pair of contacts 227 which are closed upon movement of the rheostat arm, during motor operation. The wiper motor 212 includes a field winding 228, armature brushes 229 and 231, and a motor parking linkage 232, having contacts 233, and a solenoid 234.

Figure 14:
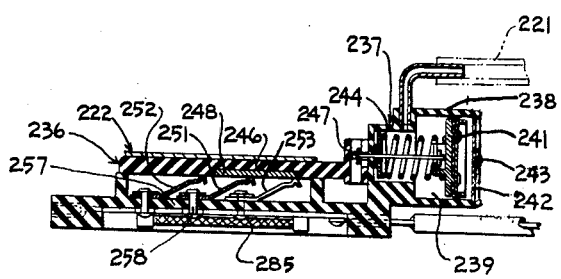
Fig. 14 is a section view as seen from line XIV—XIV in Fig. 13.
Figure 15:
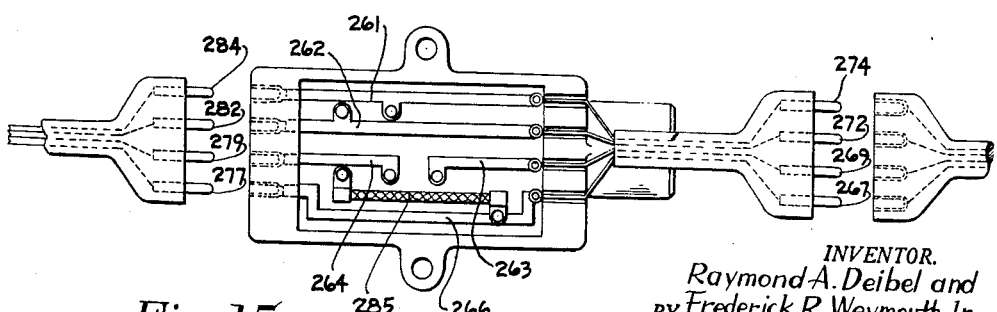
Fig. 15 is a bottom plan view of the electric switch means of Fig. 13, and including a showing of the plugs used with the switch.

The electrical switch 222 comprises an electrical portion 236, and a pneumatic portion 237 having a housing 238 with a piston chamber 239 and a piston 241 slidably mounted therein. A cover plate 242 encloses the open end of the piston chamber, and contains a centrally disposed hole 243 for admission of atmospheric pressure to the side of the piston. On the opposite side of the piston is a helical spring 244 which is adapted to urge the piston toward the right (Fig. 14). When vacuum is introduced into the piston chamber 239 on one side of the piston, a pressure differential will be created on the piston to cause the latter to move toward the left end, resulting in shifting of a movable member 246 slidably arranged in the electrical portion, and connected to the piston by a wire, or rod 247. On the undersurface of the movable member are connectors 248 and 249 adapted to be selectively engaged by contact arms 251, 252, 253, 254, and 256 depending upon the position of the movable member 246. In the off-position of the switch, as illustrated in Fig. 14, connector 248 is engaged by contact arm 251, and connector 249 is engaged by contact arms 253 and 254; in the on-position of the switch, i.e., when the piston 241 has caused movement of the movable member toward the left extreme position, connector 249 will be engaged by contact arms 254 and 256. The contact arms are secured to an electrically insulating rib 257 by rivets 258, which extend through the rib and connect at the lower end to terminal pieces 261, 262, 263, 264 and 266 respectively. The electrical switch 222 is connected to the control switch 223 in the following manner: plug-in connector 267 connects terminal piece 266 with wire 268; plug-in connector 269 connects terminal piece 263 with a wire 271; plug-in connector 272 connects terminal piece 262 with wire 273; and plug-in connector 274 connects terminal piece 261 with a wire 276. The switch 222 is connected to the motor 212 in the following manner: plug-in connector 277 connects terminal piece 266 to wire 278; plug-in connector 279 connects terminal piece 264 with wire 281; plug-in connector 282 connects terminal piece 262 with wire 283; and plug-in connector 284 connects terminal piece 261 with wire 286. A resistance wire 285, one end of which connects with terminal piece 261, the other end of which connects with contact arm 256, is adapted to regulate current through field winding 228, when the switch 222 is operating, as will be described.

A wire 287 is arranged to connect a battery 288 to one end of the field winding 228, the other end of the field winding being connected to the wire 278; the wire 281 is connected to the armature brush 231, and also makes connection with the contacts 233, the latter of which are grounded by a wire 289; and solenoid 234 is connected at one end to the wire 289, and at the other end to the wire 286.

The functions of electrical switch 222 will now be described. Assume that the vehicle operator has moved the rheostat arm 226 for motor operation, and that the switch 222 is in the off-position, i.e., movable member 246 is toward the right end of the electrical portion (Fig. 14), it will be seen that circuits are established as follows: from battery 288, through wire 287, wire 283, plug-in connector 282, terminal piece 262, plug-in connector 272, wire 273, contacts 227 (now closed), wire 276, plug-in connector 274, terminal piece 261, plug-in connector 284, wire 286, solenoid 234, to ground via wire 289, as a result of which contacts 233 will be closed. Closing of contacts 233 establishes electrical circuits as follows: from wire 287 across armature brushes 229 and 231, through wire 281, contacts 233, to ground via wire 289 and also from wire 287, through field winding 228, wire 278, plug-in connector 277, terminal piece 266, plug-in connector 267, wire 268, rheostat arm 226, rheostat 224, wire 271, plug-in connector 269, terminal piece 263, connector 249, contact arm 254, terminal piece 264, plug-in connector 279, wire 281, contacts 233 and through wire 289 to ground. Motor operation will then take place with the speed of the motor being dependent upon the value of resistance in the field winding circuit, as determined by the setting of the rheostat arm 226.

Assume that during motor operation as described, a windshield washing operation is desired by the motor vehicle operator; such operation may be initiated by depressing the lever of the pump means 217, to cause application of cleaning liquid upon the windshield, and at the same time, causing coordinating mechanism 216 to introduce vacuum into piston chamber 239, whereupon pressure differential upon piston 241 will cause the piston to move in the piston chamber, resulting in shifting of the movable member 246 to the left in the electrical portion 236. When this occurs, motor control will be taken away from switch 223 and assumed by switch 222, by virtue of establishment of circuits as follows: the circuit through field winding 228, and rheostat 224, will be interrupted by movement of the connector 249 out of engagement with contact arm 253, and at the same time circuit through the field winding 228 will be established through the resistance wire 285, which will allow current flow from terminal piece 266, across resistance wire 285, through contact arm 256, connector 249, contact arm 254, terminal piece 264, plug-in connector 279, wire 281, contacts 233, and through wire 289 to ground. It will be seen that such shifting of the movable member 246, will not effect the circuit across the armature brushes. As a result of the operation of switch 222, motor speed will be regulated in accordance with the ohmic rating of resistance wire 285, which preferably will be such as to cause motor operation at a more rapid rate than when the motor was operating with the rheostat 224, in the field winding circuit.

Suppose that the control switch 223 was in off-position, i.e., the wiper motor 212 was not being operated, and the vehicle operator wished to initiate a windshield washing and wiping operation. By simply pressing the lever of the pump means 217, cleaning liquid would be sprayed upon the windshield and the movable member 246, of the switch means, would be shifted to the left, for reasons as heretofore indicated. Circuits for motor operation would then be established as follows: from battery 288, wire 287, wire 283, plug-in connector 282, contact arm 252, connector 248, contact arm 251, terminal piece 261, plug-in connector 284, wire 286, solenoid 234, and through wire 289 to ground, resulting in the energizing of solenoid 234, and causing the closing of contacts 233. When the contacts 233 are closed, it will be seen that circuits will be established as follows: from wire 287 across armature brushes 229 and 231, through wire 281, contacts 233, through wire 289 to ground, and at the same time from wire 287, field winding 228, wire 278, plug-in connector 277, terminal piece 266, resistance wire 285, contact arm 256, connector 249, contact arm 254, terminal piece 264, plug-in connector 279, wire 281, contacts 233, through wire 289 to ground. Accordingly, the motor will operate with a speed depending upon the ohmic rating of the resistance wire 285, regulating current flow through the field winding 228, as was heretofore explained.

The coordinating mechanism 216 is arranged to maintain the vacuum in the piston chamber 239 for a predetermined period of time, and in particular, for a short time after application of cleaning liquid to the windshield, to thus provide movement of the wiper arms for drying of the windshield. When vacuum condition in piston chamber 239 is terminated, there will be an equalization of pressure on each side of the piston 249, and the piston will be returned toward the right end of the piston chamber by virtue of the helical spring 244, resulting in shifting of the movable member 246 toward the right end of the electrical portion 236. When this occurs, it will be seen that control of the motor by the switch means 222 is ended, and electrical connections are established for operation of the wiper motor under the control of the control switch 223.

From an understanding of the foregoing disclosures relative to the three embodiments of the invention, it will be seen that the objectives of the invention may be achieved in a simple manner, and that the application of a windshield washer system in a vehicle having an electrically operated wiper motor, may be conveniently accomplished. Of particular significance is the fact that the application of the invention to a motor vehicle, will not disturb or interfere with the normal operation of the wiper motor, that is, the wiper motor may be controlled for windshield wiping operation alone in the normal manner. The system of the invention complements windshield cleaning operation by allowing the vehicle operator to initiate a windshield washing and wiping operation, irrespective of whether or not the wiper motor is being operated; after cessation of such washer-wiper operation, the wiper motor will be automatically restored to the condition it was in prior to initiation of the washer-wiper operation, i.e., it will either continue operating as it was prior to initiation of the washer-wiper operating cycle, or will be parked.

The foregoing description has been given in detail for clearness and without thought of limitation since the inventive principles involved are capable of assuming other physical embodiments without departing from the spirit of the invention and the scope of the appended claims.

What is claimed is:

1. In a motor vehicle having a windshield and a windshield cleaning arrangement including an electrically powered wiper motor and a control switch therefor, the combination including: a cleaning liquid reservoir assembly having a pump unit operable for delivery of cleaning liquid to the windshield and means including a co-ordinator mechanism adapted to initiate such operation of the pump unit; and fluid pressure operated electrical switch means arranged in the circuit between the wiper motor and the control switch, said switch means being operable to control action of the motor independently of said control switch and said coordinator mechanism to maintain wiper motor operation for a predetermined period of time after termination of pump unit operation.

2. In a motor vehicle having a windshield and a windshield cleaning arrangement including an electrically powered wiper motor and a control switch therefor, the combination including a cleaning liquid reservoir assembly having a pump unit operable for delivery of cleaning liquid to the windshield, fluid pressure operated electrical switch means arranged in the circuit between the wiper motor and the control switch, said switch means being operable to control action of the wiper motor independently of said control switch, and means including a coordinating mechanism associated with the reservoir assembly and arranged to initiate operation of the pump unit and to complete a fluid pressure connection to the switch means for concurrent operation of the wiper motor, the coordinating mechanism being further arranged to operate the switch means to maintain wiper motor operation for a predetermined period of time after termination of pump unit operation.

3. In a motor vehicle having a windshield, a windshield cleaning arrangement including an electrically powered wiper motor, a control switch for the motor, and a cleaning liquid reservoir assembly having a pump unit operable for delivery of cleaning liquid to the windshield and means including a coordinating mechanism adapted to initiate operation of the pump unit, a fluid pressure operated electrical switch means adapted for electrical connection in a circuit between the control switch and the wiper motor and having a first position wherein the electrical connection between the control switch and the wiper motor is undisturbed, and a second position wherein electrical connection is made to the motor for control thereof independently of said control switch, said electric switch means being operative by virtue of fluid pressure connection with the coordinator mechanism.

4. In combination, an electric wiper motor, an electrical control switch therefor, electrical switch means having an electrical portion and a pneumatic portion, a movable member mounted in the electrical portion, piston means in the pneumatic portion being connected with the movable member, said piston means being responsive to fluid pressure differential to cause movement of the movable member, said electrical portion having contact means connecting the switch means in a circuit between the electric motor and its electrical control switch and also having connector means affixed to the movable member for engagement with said contact means, said movable member adapted when in a first position for establishment of circuits whereby control of the motor will be maintained by the electrical control switch, and adapted when moved to a second position for establishment of circuits whereby control of the motor will be maintained by the electrical switch means, washer means for delivering cleaning liquid to an associated window, and means including coordinating means for producing a fluid pressure differential across said piston means with operation of said washer means.

5. In combination, an electric wiper motor, an electrical control switch therefor, switch means having an electrical portion and a pneumatic portion, a movable member mounted in the electrical portion, piston means in the pneumatic portion being connected with the movable member, said piston means being responsive to fluid pressure differential to cause movement of the movable member, said electrical portion having contact means connecting the switch means in a circuit between the electric motor and its electrical control switch and also having connector means affixed to the movable member for selective engagement with said contact means for establishment of electrical circuits whereby control of the motor may be removed from the control switch and assumed by the switch means, washer means for delivering cleaning liquid to an associated window, and means including coordinating means for producing a fluid pressure differential across said piston means with operation of said washer means.

6. In combination, an electric motor, an electrical control switch therefor, switch means having an electrical portion and a pneumatic portion, a movable member mounted in the electrical portion, piston means in the pneumatic portion being connected with the movable member, said piston means arranged for movement in one direction upon application of a fluid pressure differential and movable in the opposite direction by resilient means, said electrical portion being arranged for connecting the switch means in a circuit between the electric motor and its electrical control switch, said electrical portion having connectors affixed to the movable member and contact arms forming part of the electrical circuit connections through the switch means, said movable member adapted when in a first position to establish electrical circuits whereby the operation of the motor may be controlled by the electrical control switch, and adapted when in a second position to establish electrical circuits whereby the operation of the motor may be controlled by the switch means, washer means for delivering cleaning liquid to an associated window, and means including coordinating means for producing a fluid pressure differential across said piston means with operation of said washer means.

7. An electric motor, control switch means therefor having a selectively variable motor speed controlling resistance, and an electric switch operatively connected between said motor and said control switch means and including a movable member, piston means responsive to fluid pressure differential to cause movement of the movable member, resilient means tending to resist such movement of the movable member, connectors on the movable member, a resistance means arranged in the switch, and a plurality of contact arms selectively engageable by the connectors for establishing various motor energizing electrical circuits through the switch, one of said circuits excluding the variable resistance and including the resistance means when the movable member has been shifted by the piston means, and said resistance means being excluded from the circuits established when the movable member is returned to original position by said resilient means upon termination of fluid pressure differential.

8. An electric motor, control switch means therefor including a selectively variable motor speed controlling resistance, and an electric switch operatively connected between said motor and said control switch means and including a movable member, piston means responsive to fluid pressure differential to cause movement of the movable member from a first position to a second position, connectors on the movable member, resilient means tending to resist such movement of the movable member, a plurality of contact arms selectively engageable by the connectors, and a resistance means connected between two of the contact arms, said connectors being arranged for establishment of a motor energizing electrical circuit through the switch via the connectors on the contact arms inclusive of the variable resistance and exclusive of the resistance means when the movable member is in the first position and being further arranged for establishment of a motor energizing electrical circuit through the switch via the connectors and the contact arms exclusive of the variable resistance and inclusive of the resistance means when the movable member is in the second position, said resilient means being arranged for shifting the movable member from the second to the first position when fluid pressure differential upon the piston means is terminated.

9. In combination with an electric motor and a control switch therefor having a variable resistance, an electrical switch including a movable member having connectors affixed thereto, means responsive to fluid pressure differential to cause movement of said movable member, a resilient means tending to resist such movement of the movable member, a plurality of contact arms selectively engageable by the connectors, and a resistance element connected between two of the contact arms, said connectors each being arranged for exclusive engagement with a given pair of contact arms, said movable member being adapted when in a first position for locating two connectors for contact arm engagement to complete a motor energizing circuit exclusive of the resistance element, and being adapted when moved to a second position for locating two connectors for contact arm engagement wherein the contact arms connected to the resistance element are included among the contact arms engaged by the connectors and thereby placed in the motor energizing circuit.

10. In combination with an electric motor and a control switch therefor having a variable resistance, an electrical switch in the motor energizing circuit including a movable member having electrical connectors affixed thereto, a piston slidably arranged in a piston chamber, a nipple for connecting one end of the piston chamber to a source of vacuum whereby movement of the piston will occur under atmospheric pressure, means connecting the piston to said movable member, a helical spring tending to resist such movement of the piston, a plurality of contacting arms selectively engageable by the connectors, and a resistance element connected between two of the contact arms, said connectors each arranged for exclusive engagement with a given pair of contact arms, said movable member being adapted when in a first position for locating two connectors for contact arm engagement to place the control switch resistance in the motor energizing circuit and exclude the resistance element therefrom, and adapted when moved to a second position for locating said connectors for contact arm engagement wherein the contact arms joined by the resistance element are included among the contact arms engaged by the connectors and thereby placed in the motor energizing circuit.

11. In an electrical system including a motor and a control switch having a variable resistance, said resistance adapted for regulating current through the field winding of the motor for speed regulation thereof, a switch means interposed in the circuit connecting the control switch to the motor, said switch means including a resistance element, a fluid pressure responsive movable means adapted to change the switch means from a first position setting wherein the variable resistance of the control switch is in the circuit through the field winding, to a second position setting wherein the variable resistance of the control switch will be cut out of the field winding circuit while the resistance element of the switch means will be put in the field winding circuit, and resilient means arranged to return the setting of the switch from second to first position.

12. In a motor vehicle having a windshield and a windshield cleaning arrangement including an electrically powered wiper motor and a control switch therefor, the combination including: a cleaning fluid reservoir assembly having a pump unit operable for delivery of cleaning fluid under pressure to the windshield, and a coordinating mechanism affecting utilization of pressure delivered by said pump; control means adapted to initiate operation of the pump unit; and fluid pressure operated electrical switch means arranged in a circuit between the wiper motor and the control switch, said switch means being operable to control action of the motor independently of said control switch, and said coordinating mechanism being operable to complete a fluid pressure connection to the switch means for operating the wiper motor concurrently with operation of the pump unit and for maintaining wiper motor operation during a predetermined period of time after termination of pump unit operation.

References Cited in the file of this patent

UNITED STATES PATENTS

| | | |
|---|---|---|
| 2,185,071 | Alcoran | Dec. 26, 1939 |
| 2,634,400 | Sweet | Apr. 7, 1953 |
| 2,743,473 | Oishei | Mar. 1, 1956 |